May 24, 1932.  W. M. SHEEHAN  1,859,895
RAILWAY VEHICLE UNDERFRAME
Filed Nov. 10, 1930   3 Sheets-Sheet 1
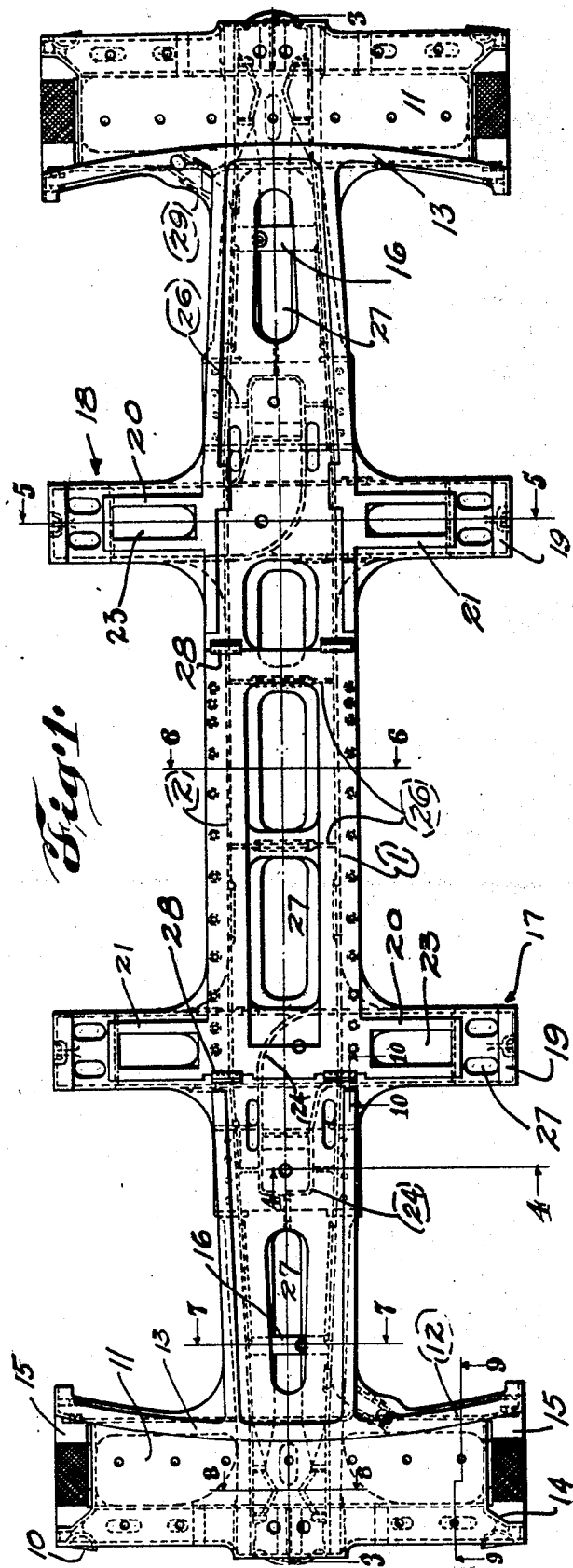
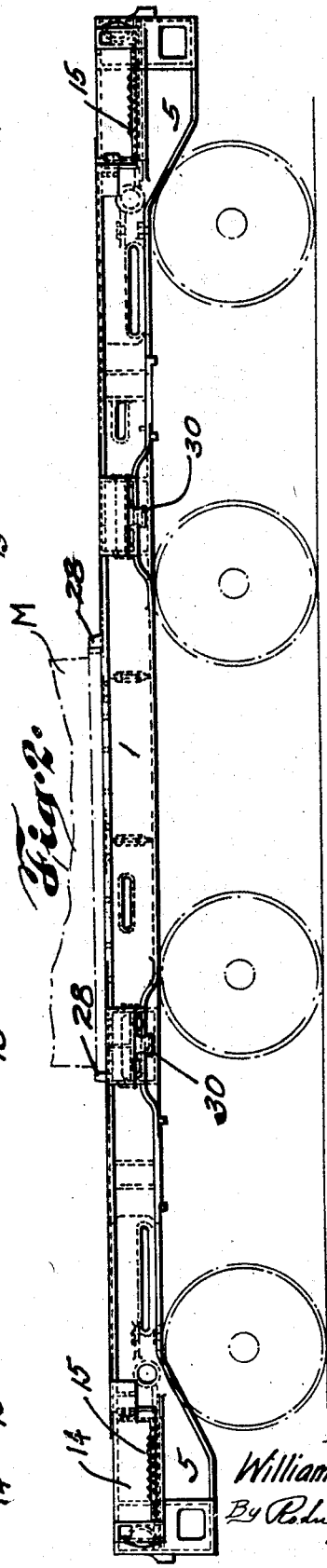
Inventor
William M. Sheehan
By Rodney Bedell
Attorney

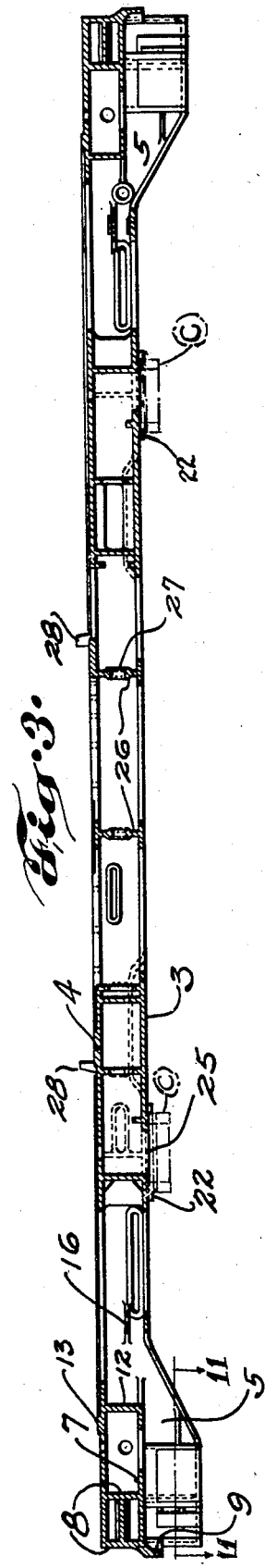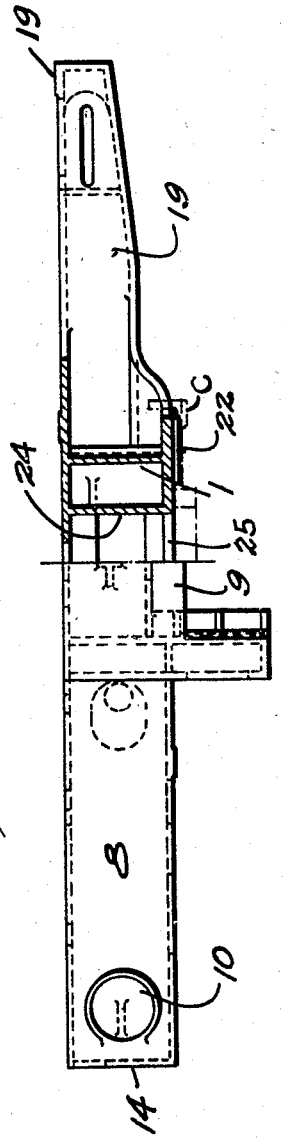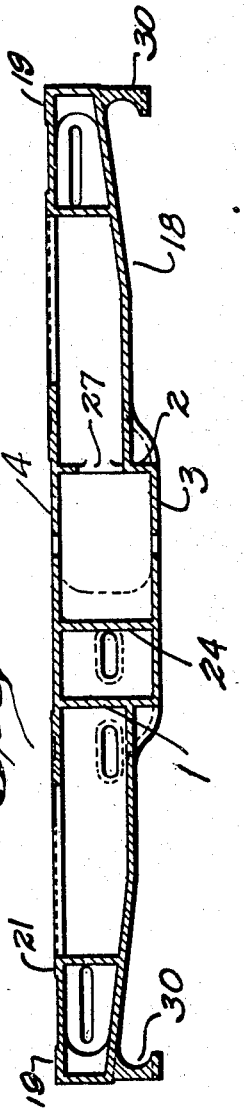

May 24, 1932. W. M. SHEEHAN 1,859,895
RAILWAY VEHICLE UNDERFRAME
Filed Nov.10, 1930 3 Sheets-Sheet 3
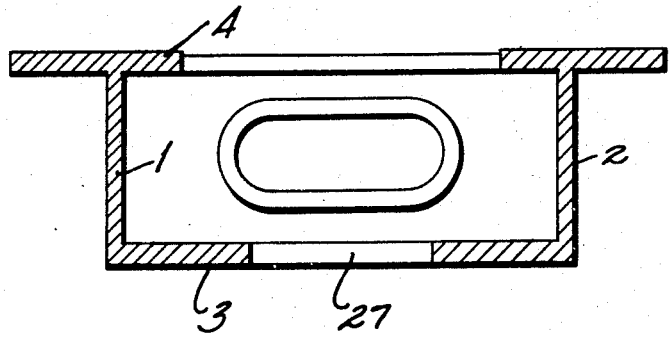
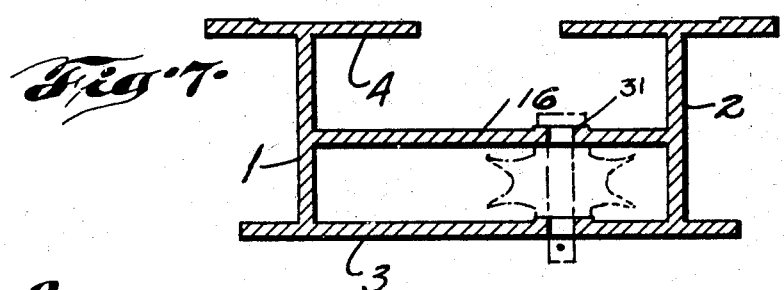
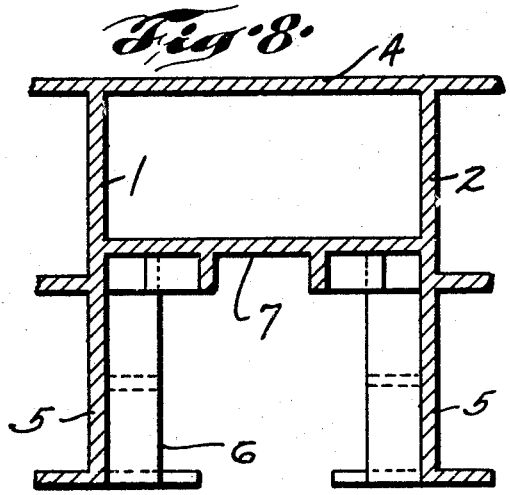
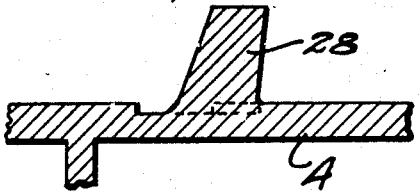
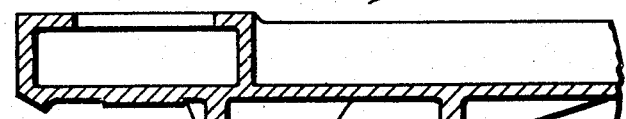
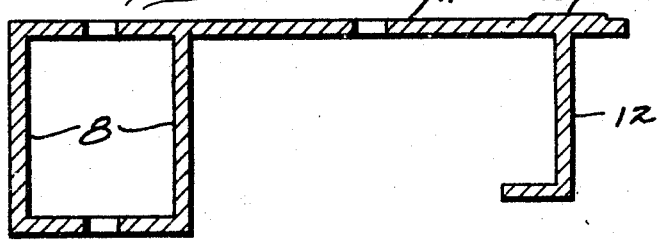
Inventor
William M. Sheehan
By Rodney Bedell
Attorney Patented May 24, 1932

1,859,895

UNITED STATES PATENT OFFICE

WILLIAM M. SHEEHAN, OF MARION, PENNSYLVANIA, ASSIGNOR TO GENERAL STEEL CASTINGS CORPORATION, OF GRANITE CITY, ILLINOIS, A CORPORATION OF DELAWARE

RAILWAY VEHICLE UNDERFRAME

Application filed November 10, 1930. Serial No. 494,782.

My invention relates to railway rolling stock and consists in a novel underframe structure particularly adapted for use in vehicles of the type having internal combustion motors and a generator driven thereby. Such vehicles may comprise a locomotive or a car with motor equipment.

The main object of my invention is to provide a light weight, rigid, and strong underframe which will form a suitable carrying member for the motor and other equipment and will satisfactorily transmit longitudinal forces applied to the vehicle. I also desire to avoid delays and expense due to frequent inspection and repairs necessary to maintain the underframe in proper condition. Preferably, I attain this object by casting the underframe in a single piece, or by otherwise forming a unitary structure as by welding two or more parts together into an integral whole.

Other objects of my invention are to provide equipment supporting arms spaced longitudinally of the underframe a substantial distance from the center plate portions where the trucks are pivoted to the underframe, and to provide continuous passageways or conduits from such arms to the center plate structure for the passage of air currents to the truck motors.

These and other detail objects of my invention are obtained in the structure shown in the accompanying illustrations of an embodiment of my invention consisting of an oil-electric locomotive underframe. In the drawings:

Figure 1 is a top view of my novel underframe.

Figure 2 is a side elevation of the same showing the relative positions of the truck wheels.

Figure 3 is a vertical longitudinal section taken on line 3—3 of Figure 1.

Figure 4 is in part an end view and in part a transverse section on the line 4—4 of Figure 1.

Figures 5, 6, 7, and 8 are vertical transverse sections taken on the corresponding section lines of Figure 1.

Figures 9 and 10 are vertical longitudinal sections taken on the corresponding section lines of Figure 1.

Figure 11 is a horizontal section taken on line 11—11 of Figure 3.

The underframe includes a longitudinal central member, transverse end members, and two transverse arms intermediate the end members. The central member comprises spaced vertical webs 1 and 2, a horizontal bottom web 3, and a top web 4. This structure forms a substantially box shaped sill extending from end to end of the underframe and integral elements are provided on the elements enumerated, when desired, for various purposes; for instance, the webs 1 and 2 are deepened near their ends to form the sides 5 of a draft housing and integral draft gear stops 6 are formed thereon. Horizontal web 3 terminates adjacent the inner ends of walls 5, but an offset extension thereof, indicated at 7, forms the top wall of the draft housing.

A box section end sill is formed by vertical webs 8 and lateral extensions of webs 4 and 7 and includes a coupler striking plate 9 and push pole pockets 10. Lateral extensions of web 4, indicated at 11, form a platform extending from side to side of the underframe and a vertical web 12 spaced from the end sill reinforces the platform beneath a pad 13 provided thereon which is arranged to mount the end of the cab superstructure.

Each end of the platform is provided with a depressed part 15 and a recessed end wall 14 providing a step in the platform below the level of its remaining portion.

A suitable bracing rib or bar 16 extends between webs 1 and 2 near the inner end of draft housing webs 5 and above the level of web 3. The bearings 31 are provided in bar 16 and web 3 for a hand brake pulley pin (see Figure 7).

The intermediate arms 17 and 18 are in the shape of box sections with their vertical walls merging with webs 1 and 2 and with their top walls forming extensions of web 4 and their bottom walls being offset extensions of web 3. The outer ends of these arms are provided with pads 19 for mounting the cab and similar pads 20 and 21 serve to mount blowers, compressors, and other equipment (not shown). The central portion of the frame has its upper surface arranged to receive the internal combustion motor M and generator carried thereby.

The center plates C are applied to the bottom of the center member of the underframe intermediate the arms 18, 19, and the end members, lugs 22 on the center member engaging the edges of the center plates to retain them against movement along the underframe and to relieve holding rivets or welds of shearing forces.

The top wall of each of the arms 17 and 18 has an opening 23 between the blower mounting pads 20. The walls of the arm, together with extensions 24, form a conduit for an air stream from the blower passing inwardly and downwardly through an opening 25 in web 3 so as to be lead through the center plate structure into a truck passageway which discharges against the electric motor to cool the same.

The offsetting of arms 17 and 18 from the center plate structure enables me to distribute equipment and the superstructure load evenly over the underframe and at the same time to keep the trucks near the ends of the locomotive to avoid excessive overhang and undue lateral movement of the ends of the frame when the locomotive is on a curve.

The center member is suitably braced by intermediate transverse webs 26 and all of the webs are provided with openings 27 to lighten the structure and to facilitate removal of the core sand and other operations in preparing the casting and assembling it with the trucks and superstructure.

Various brackets and lugs may be formed integrally with the frame where desired and I indicate upstanding lugs 28 for holding the motor against movement on the frame, brackets 29 for mounting brake rigging elements, and lugs 30 on the ends of arms 17 and 18 for lifting chains.

The main features of my invention may be utilized without including all of the elements described above and many of the features may be included in a structure other than a one-piece underframe, although the latter is my preferred construction. I contemplate the exclusive use of all such modifications in the underframe construction as may be suggested to those skilled in the art and which come within the scope of my claims.

I claim:

1. In a railway vehicle underframe, a longitudinal member, and an arm projecting laterally therefrom, said arm and member forming an air conduit leading from an inlet opening in said arm to an outlet opening in said member.

2. In a railway vehicle underframe, a main longitudinal central member having a portion adapted to mount a center plate, an arm projecting transversely therefrom and including a portion adapted to mount a blower, elements of said member and arm forming an air conduit between said arm portion and said central member portion.

3. In a railway vehicle underframe, a main longitudinal central member, an arm projecting transversely therefrom and adapted to mount a blower, a portion of said member being arranged to mount a center plate spaced longitudinally of the underframe from said arm, elements of said member and arm forming a conduit for leading air from the blower to the center plate.

4. In a railway vehicle underframe, a main longitudinal central member having an opening in its bottom portion, and an arm projecting transversely therefrom having an opening in its top portion, said member and arm cooperating to form a conduit for air between said openings.

5. In a railway vehicle underframe, a longitudinal member of box section, an arm of box section projecting laterally therefrom, the side walls of said arm having extensions within said member cooperating with the top and bottom walls thereof to form an air conduit extending inwardly from said arm and then curving to extend longitudinally of said member.

6. In a railway vehicle underframe, a main central longitudinal member of box section, an arm of box section projecting transversely therefrom and adapted to mount a blower, a portion of said central member spaced longitudinally of said member from said arm being arranged to mount a center plate, the sides of said arm having extensions within said member cooperating with the top and bottom walls thereof to form an air conduit extending inwardly from said arm and then curving to extend longitudinally of said member to said center plate mounting portion.

7. In a railway vehicle underframe, a main longitudinal central member, arms extending transversely thereof and each adapted to mount a blower, a center plate mounting portion of said member being positioned between said arms and the ends of the underframe, portions of said arms and member forming air passageways leading from each of said arms inwardly through the side of said center member and then lengthwise thereof to said center plate mounting elements.

8. In a railway vehicle underframe, a main longitudinal central member, arms extending transversely thereof, end sills spaced from said arms, the top walls of said end sills being extended inwardly thereof to form a platform, a superstructure mounting element extending across the inner end of said platform, and a vertical web below said element extending substantially from side to side of the underframe.

9. An article of manufacture consisting of an underframe comprising a longitudinal member and transverse arms projecting therefrom constituting an integral structure free of riveted or bolted joints between overlapping parts assembled with each other, portions of said integral structure forming an air conduit leading from the outer part of one of said arms into and along said longitudinal member.

10. A railway vehicle underframe comprising a central longitudinal main member of box cross section, and end sill of box section projecting outwardly from said member, the top wall of said sill and section being extended to form a platform at the rear of said sill, a superstructure support element extending across the inner end of said platform, and a vertical web below said element, all of said parts forming an integral structure free of riveted or bolted joints.

11. As a new article of manufacture, a railway vehicle underframe consisting of an integral structure free of riveted or bolted joints between assembled parts and comprising a main central member extending from end to end of the underframe and adapted to carry an internal combustion engine and an electric generator, and arms projecting outwardly from said member and arranged to carry blowers, compressors, and like equipment, and end sill and platform forming extensions projecting outwardly from said member, said arms and extensions being adapted to mount cab superstructure.

12. In a railway vehicle underframe, a main longitudinal central member, vertical webs extending transversely of the underframe and spaced from each other near one end thereof, a horizontal web forming a top wall for said member and having extensions connecting said webs throughout their length and forming a platform, there being a depressed recess at the outer ends of said extensions forming steps below said platform.

13. In a railway vehicle underframe, an end platform, a raised pad on the inner portion of said platfrom for mounting a cab, said web having a portion depressed near the side of the underframe to form a step positioned between said pad and the front edge of said platform.

14. In a railway vehicle underframe, an end sill including a top web extending inwardly therefrom, a raised pad on said web for mounting a superstructure and inclined from the longitudinal center of the underframe towards the sides thereof and away from the end of the underframe, said web having a depression near the side of the underframe to form a step between said pad and said end sill.

15. In a railway vehicle underframe, a main longitudinal central member of box cross section adapted to mount an internal combustion motor and generator, and arms of box section extending transversely from said member and adapted to mount blowers, compressors, and like equipment on their outer portions, said member and arms including elements forming passageways for conducting air from said equipment to points located centrally of the underframe and spaced longitudinally thereof from said arms.

16. In a railway vehicle underframe, a main longitudinal central member adapted to support a motor, and a transverse member adapted to support other equipment, said central member having a portion of its underside located between said transverse member and the end of said underframe arranged for attaching a body center plate.

17. In a railway vehicle underframe, an end sill including a top web extending inwardly therefrom and having elements arranged for mounting a superstructure end wall on the inner edge thereof, said web comprising a platform outside of said elements.

18. In a railway vehicle underframe, an end sill including a top web extending inwardly therefrom and having elements arranged for mounting a superstructure end wall on the inner edge thereof, said web comprising a platform outside of said elements, and members forming a draft gear housing located below said end sill and web.

In testimony whereof I hereunto affix my signature this 30th day of October, 1930.

WILLIAM M. SHEEHAN.